(12) United States Patent
Cohen et al.

(10) Patent No.: US 8,447,098 B1
(45) Date of Patent: May 21, 2013

(54) MODEL-BASED STEREO MATCHING

(75) Inventors: Scott D. Cohen, Sunnyvale, CA (US); Qingxiong Yang, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 242 days.

(21) Appl. No.: 12/952,431

(22) Filed: Nov. 23, 2010

Related U.S. Application Data

(60) Provisional application No. 61/375,536, filed on Aug. 20, 2010.

(51) Int. Cl.
*G06K 9/00* (2006.01)

(52) U.S. Cl.
USPC .......................................................... 382/154

(58) Field of Classification Search
USPC .......................................... 382/154, 284, 294
See application file for complete search history.

(56) References Cited

U.S. PATENT DOCUMENTS

| | | | |
|---|---|---|---|
| 6,757,086 B1 * | 6/2004 | Mori et al. | ....................... 359/25 |
| 7,616,198 B2 | 11/2009 | Herken et al. | |
| 7,646,909 B2 | 1/2010 | Jiang et al. | |
| 7,756,325 B2 | 7/2010 | Vetter et al. | |
| 7,835,568 B2 | 11/2010 | Park et al. | |
| 8,094,928 B2 * | 1/2012 | Graepel et al. | ................ 382/154 |
| 2007/0031028 A1 | 2/2007 | Vetter et al. | |
| 2007/0183653 A1 | 8/2007 | Medioni et al. | |
| 2008/0152200 A1 | 6/2008 | Medioni et al. | |
| 2008/0152213 A1 | 6/2008 | Medioni et al. | |
| 2009/0052748 A1 | 2/2009 | Jiang et al. | |
| 2009/0103786 A1 | 4/2009 | Ives et al. | |
| 2009/0153552 A1 | 6/2009 | Fidaleo et al. | |
| 2009/0153577 A1 | 6/2009 | Ghyme et al. | |
| 2011/0025827 A1 * | 2/2011 | Shpunt et al. | ................... 348/47 |

OTHER PUBLICATIONS (Encisco, E., "Synthesis of 3D faces", 1999, Integrated Media Systems Center, University of Southern California).*
(Klaudiny, Martin, High-detail 3D capture of Facial Performance, May 2010, University of Surrey, Guildford GU2 7XH, UK).*
(Sun, Jian, "Sterro Matching Using Belief Propagation", Jul. 2003, IEEE Transactions on Pattern Analysis and Machine Intelligence, COI. 25).*

(Continued)

*Primary Examiner* — Samir Ahmed
*Assistant Examiner* — Totam Le
(74) *Attorney, Agent, or Firm* — Wolfe-SBMC

(57) ABSTRACT

Model-based stereo matching from a stereo pair of images of a given object, such as a human face, may result in a high quality depth map. Integrated modeling may combine coarse stereo matching of an object with details from a known 3D model of a different object to create a smooth, high quality depth map that captures the characteristics of the object. A semi-automated process may align the features of the object and the 3D model. A fusion technique may employ a stereo matching confidence measure to assist in combining the stereo results and the roughly aligned 3D model. A normal map and a light direction may be computed. In one embodiment, the normal values and light direction may be used to iteratively perform the fusion technique. A shape-from-shading technique may be employed to refine the normals implied by the fusion output depth map and to bring out fine details. The normals may be used to re-light the object from different light positions.

31 Claims, 10 Drawing Sheets

OTHER PUBLICATIONS

Blanz, V., and Vetter, T. 1999. A Morphable Model for the Synthesis of 3D Faces, Siggraph 1999, 8 pages. Kemelmacher, I., Basri, R. 2010. 3D Face Reconstruction from a Single Image Using a Single Reference Face Shape, TPAMI 2010, 14 pages.

Blanz, Research Projects, 10 pages downloaded from http://www.mpi-inf.mpg.de/~blanz/ on Nov. 23, 2010.

Ira Kemelmacher, et al., "Molding Face Shapes by Example," Weizmann Institute of Science, downloaded on Nov. 23, 2010, http://www.wisdom.weizmann.ac.il/~vision/faces/, 2 pages.

Q. Yang, L. Wang, and N. Ahuja. A constant-space belief propagation algorithm for stereo matching. In CVPR, 2010, 8 pages.

P. Besl and N. McKay. A method for registration of 3-d shapes. IEEE Transactions on Pattern Analysis and Machine Intelligence, 14:239-256, 1992, 18 pages.

P. Perez, M. Gangnet, and A. Blake. Poisson image editing. Siggraph, 22(3):313-318, 2003, 6 pages.

S. Umeyama. Least-squares estimation of transformation parameters between two point patterns. IEEE Transactions on Pattern Analysis and Machine Intelligence, 13(4):376-380, 1991.

Q. Yang, et al. "Real-time Global Stereo Matching Using Hierarchical Belief Propagation," 2006, 10 pages.

Q. Yang, L. Wang, and N. Ahuja. A constant-space belief propagation algorithm for stereo matching. In CVPR, 2010.

* cited by examiner

MODEL-BASED STEREO MATCHING

PRIORITY INFORMATION

This application claims benefit of priority of U.S. Provisional Application Ser. No. 61/375,536 entitled "Methods and Apparatus for Model-Based Stereo Matching" filed Aug. 20, 2010, the content of which is incorporated by reference herein in its entirety.

BACKGROUND

1. Technical Field

This disclosure relates generally to image processing, and more specifically, stereo image processing.

2. Description of the Related Art

Conventional stereo matching techniques are unreliable in many cases due to occlusions (where a point may be visible in one stereo image but not the other), lack of texture (constant color, not much detail), and specular highlights (a highlighted portion that may move around in different camera views). All of these difficulties exist when applying stereo matching techniques to human faces, with lack of texture being a particular problem. The difficulties apply to other types of objects as well. FIG. 1 illustrates an example of a result of a conventional stereo matching technique, as applied to a human face, and indicates problem areas caused by occlusions, lack of texture, and specular highlights.

While commercial stereo cameras are emerging, many if not most image processing applications do not provide tools to process stereo images, or, if they do, the tools have limitations.

SUMMARY

Various embodiments of model-based stereo matching are described. Reliable correspondences will be the basis of many stereo image processing tool features, such as a paint brush that simultaneously paints or applies some local effect to the corresponding areas of a stereo pair, and automatic view morphing. Embodiments may implement a model-based stereo matching technique that may be used to obtain a high quality depth map and/or other output for an object, such as a human face, from an input pair of stereo images.

Some embodiments may employ a three-dimensional (3D) face model method that may regularize and address the problems encountered in conventional stereo matching techniques. One integrated modeling method is described that combines the coarse shape of a subject's face, obtained by stereo matching, with details from a 3D face model, which may be of a different person, to create a smooth, high quality depth map that captures the characteristics of the subject's face. In one embodiment, a semi-automated process may be used to align the facial features of the subject and the 3D model. A fusion technique may be employed that utilizes a stereo matching confidence measure to assist in intelligently combining the ordinary stereo results and the roughly aligned 3D model. A shape-from-shading method may be employed with a simple Lambertian model to refine the normals implied by the fusion output depth map and to bring out very fine facial details such as wrinkles and creases that may not be possible to capture with conventional stereo matching. The quality of the normal maps may allow them to be used to re-light a subject's face from different light positions.

In some embodiments, inputs to the framework may include a stereo image pair of a person's face and a pre-established face model, for example obtained from a 3D laser scanner, which is of a different subject than the subject in the stereo image pair. In some embodiments, a library of models or model database that includes a plurality of models may be provided as inputs and used in the framework instead of a single model. Embodiments may apply stereo vision to the input stereo image pair to obtain a rough 3D face model, which may be limited in accuracy, and then use it to guide the registration and alignment of the laser-scanned face model.

Embodiments may employ a method that combines the rough 3D face model with the laser-scanned face model to produce a fused model that approximates both, such that the details from the laser-scanned face model can be transferred to the model obtained from stereo vision. The formulation used by embodiments may be linear and can be solved efficiently, for example using a conjugated gradient method. The method can also naturally integrate the confidence of the result obtained from stereo vision. At least some embodiments may employ loopy belief propagation in a confidence estimation technique. At least some embodiments may employ a method for estimating the surface normal and light direction. In some embodiments, the fused model may be refined using shading information from the stereo image pair.

While some embodiments are directed toward modeling human faces, it is noted that embodiments of the disclosed modeling techniques can be employed or adapted to model other types of objects.

Figure 1:
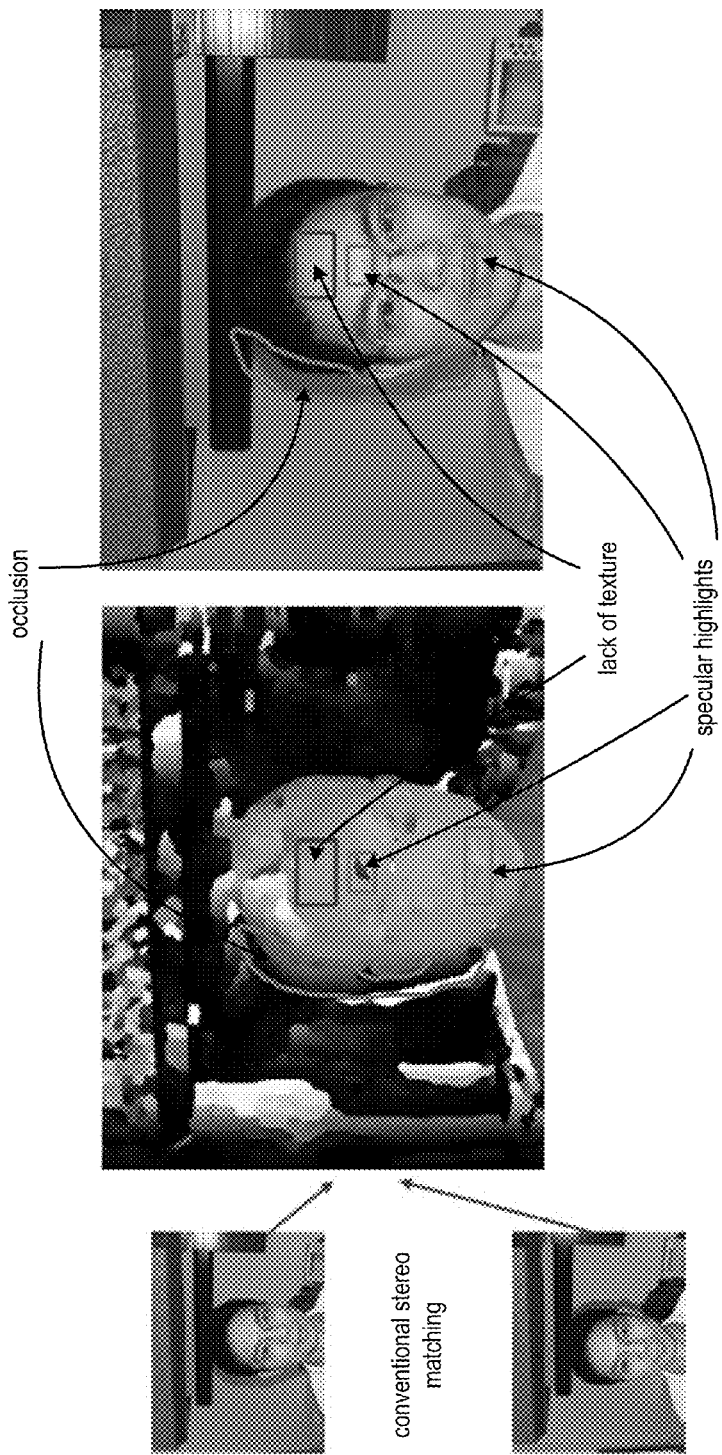
FIG. 1 illustrates an example of a result of a conventional stereo matching technique, as applied to a human face, and indicates problem areas caused by occlusions, lack of texture, and specular highlights.

While the disclosure is described by way of example for several embodiments and illustrative drawings, those skilled in the art will recognize that the disclosure is not limited to the embodiments or drawings described. It should be understood, that the drawings and detailed description are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for model-based stereo matching are described. Embodiments may implement a model-based stereo matching technique that may be used to obtain a high quality depth map and other outputs for a human face, or for other types of objects, from an input stereo pair of images. An integrated modeling method is described that combines the coarse shape of a subject's face obtained by stereo matching with the details from a 3D face model (of a different person) to create a smooth, high quality depth map that captures the characteristics of the subject's face.

Figure 2:
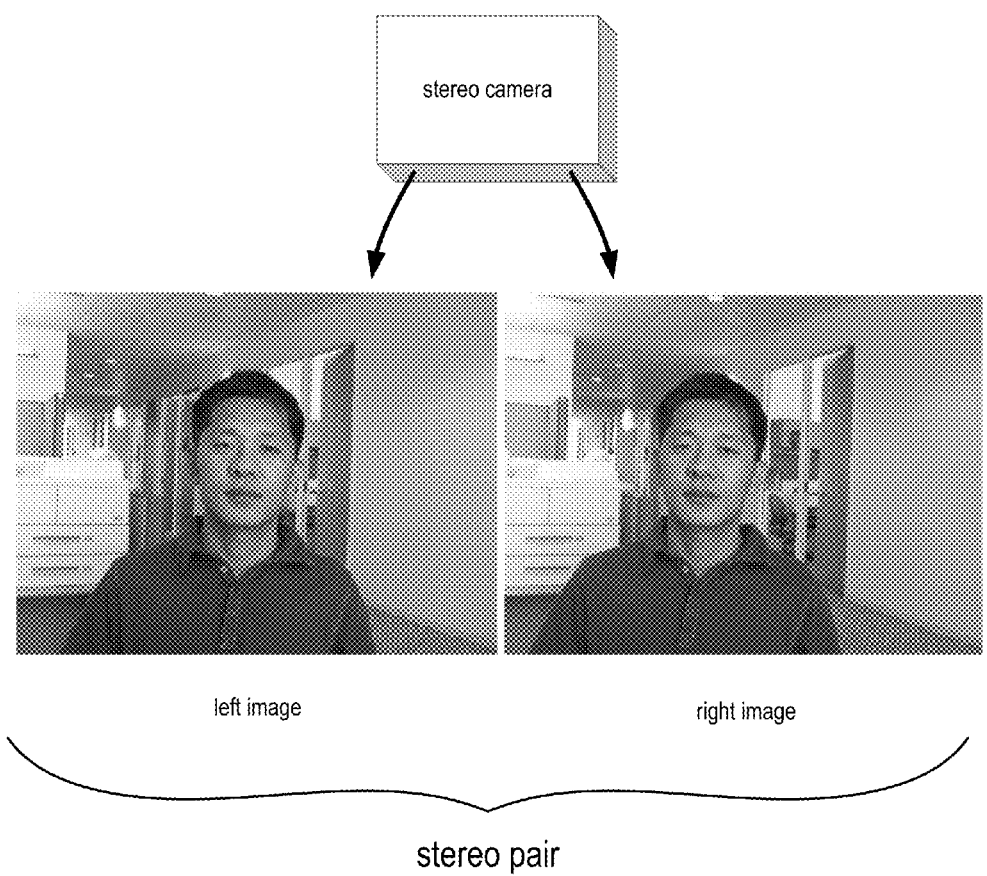
FIG. 2 illustrates an example of a stereo pair of images (a left and right image) captured using a stereo camera.

Turning now to FIG. 2, an example stereo pair of input images (a left and right image) is shown. The stereo pair of images may be captured using a stereo camera that may, in some embodiments, collectively serve as one input to the disclosed stereo matching process. In other embodiments, an n-way stereo that takes in n images could be provided as an input to the disclosed stereo matching process. The input images may be lit from any direction, including from the camera direction. This may allow a flash to be used in capturing the images.

Figure 3:
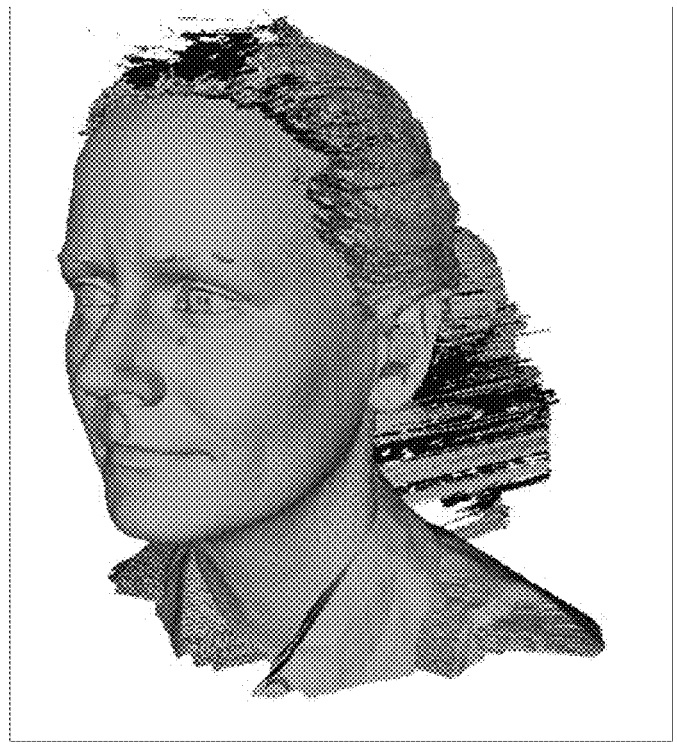
FIG. 3 illustrates an example laser-scanned 3D model of a human face.
Figure 4:
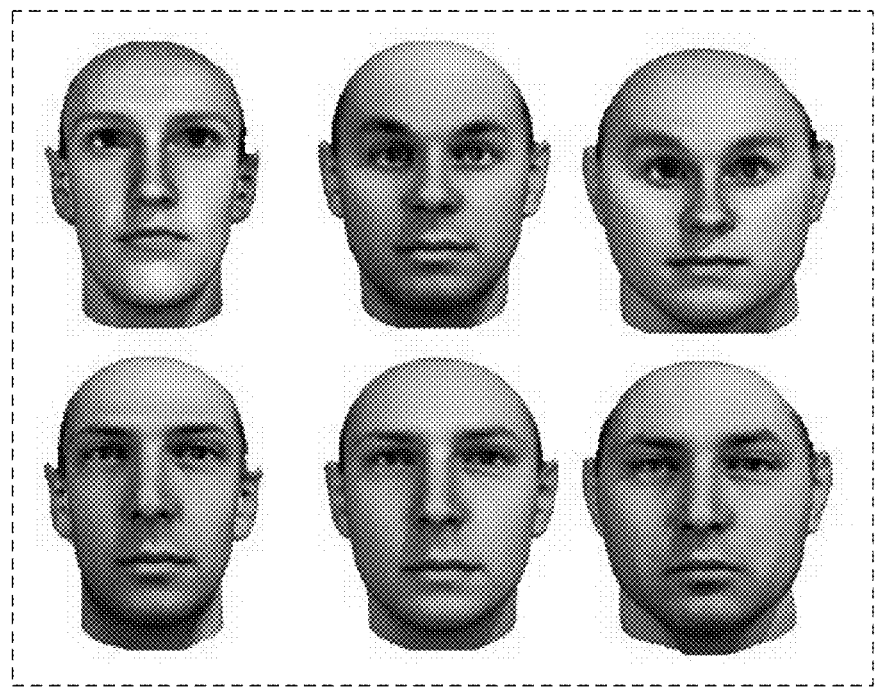
FIG. 4 illustrates an example 3D model database.

FIG. 3 shows an example laser-scanned 3D model of a human face that may, in some embodiments, serve as one input to the disclosed stereo matching process. In some embodiments, a library of models or a model database that includes a plurality of models may be used instead of a single 3D model. FIG. 4 shows an example of such a model database. In one embodiment, the input 3D model may be a non-laser-scanned model. For example, the output of the disclosed process may be fed back and used as the input model in one iterative embodiment.

Figure 5:
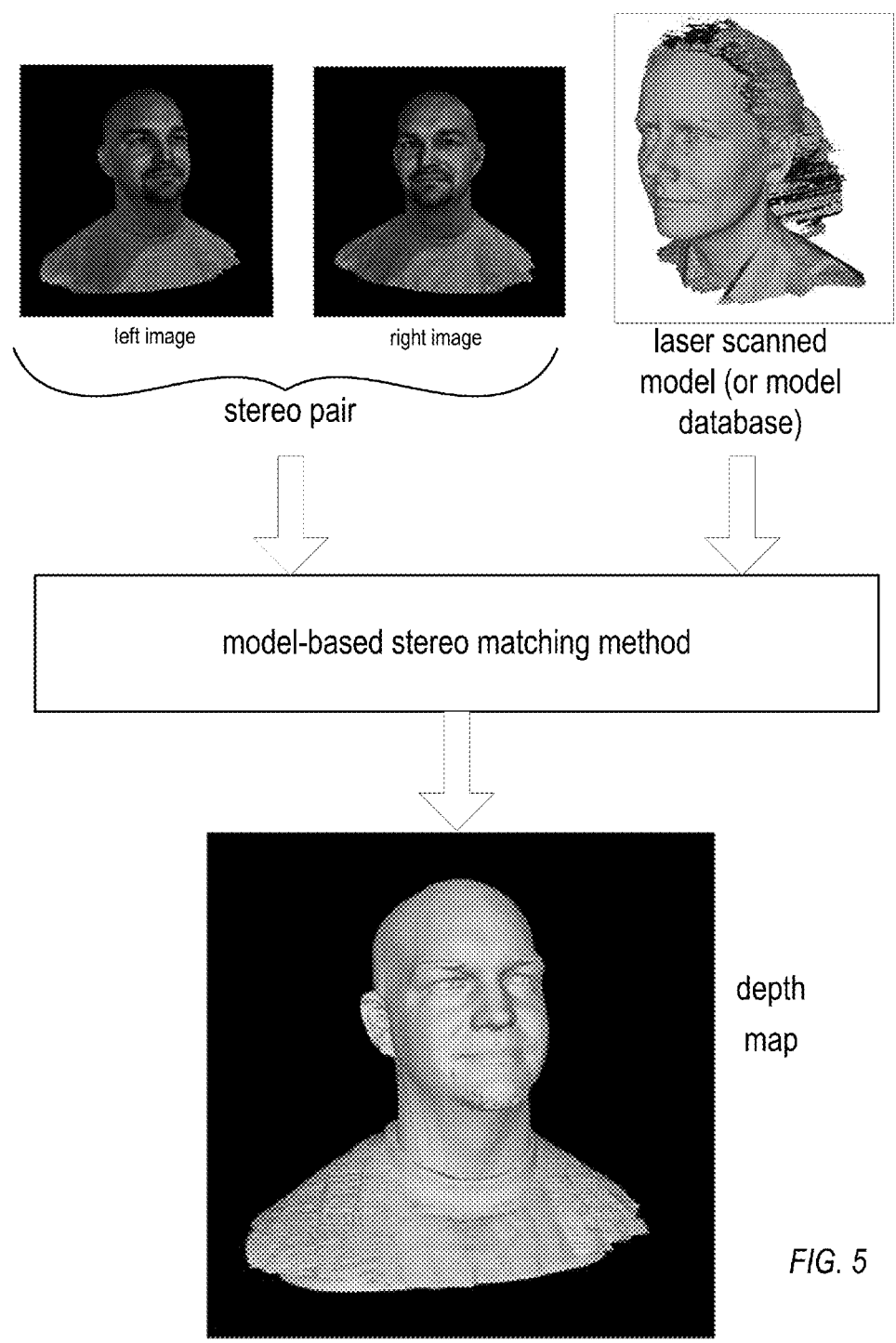
FIG. 5 is a high-level block diagram that shows example inputs to the model-based stereo matching method, and an example depth map output, according to at least some embodiments.

FIG. 5 is a high-level block diagram that shows example inputs, in the form of a pair of stereo images and a laser-scanned 3D model, to the model-based stereo matching method, and an example depth map output, according to at least some embodiments.

In at least some embodiments of the model-based stereo matching method, a semi-automated process may be used to align the facial features of the subject and the 3D model. In some embodiments, the alignment process may be fully automated. A fusion algorithm may then employ a stereo matching confidence measure to assist in intelligently combining the ordinary stereo results with the roughly-aligned 3D model. Finally, a shape-from-shading technique may be employed with a simple Lambertian model to refine the normals implied by the fusion output depth map and to bring out very fine facial details such as wrinkles and creases that were not possible to capture with conventional stereo matching. The quality of the normal maps may enable them to re-light a subject's face from different light positions.

Figure 6:
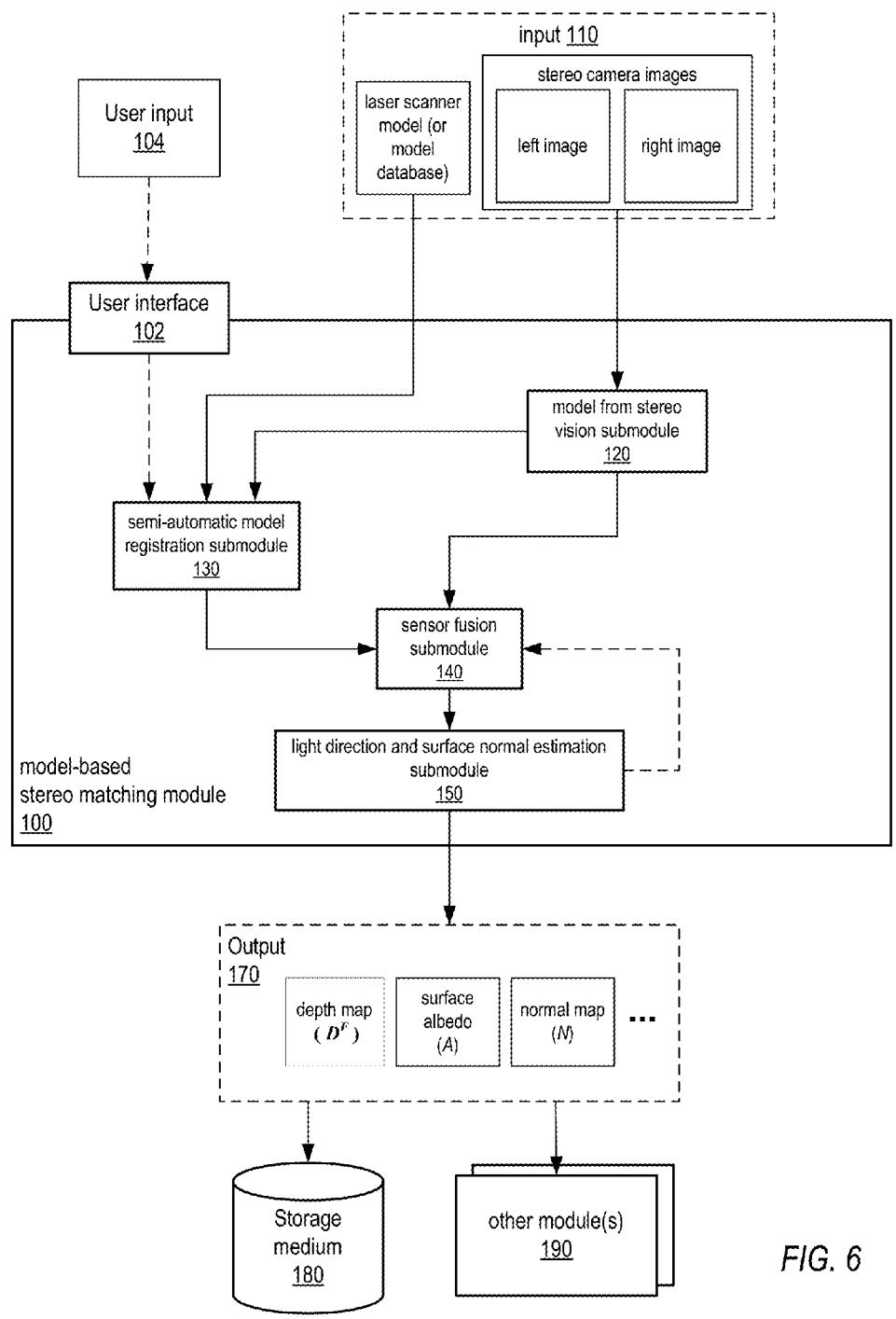
FIG. 6 illustrates an example module that may implement an integrated modeling method, according to some embodiments.
Figure 7:
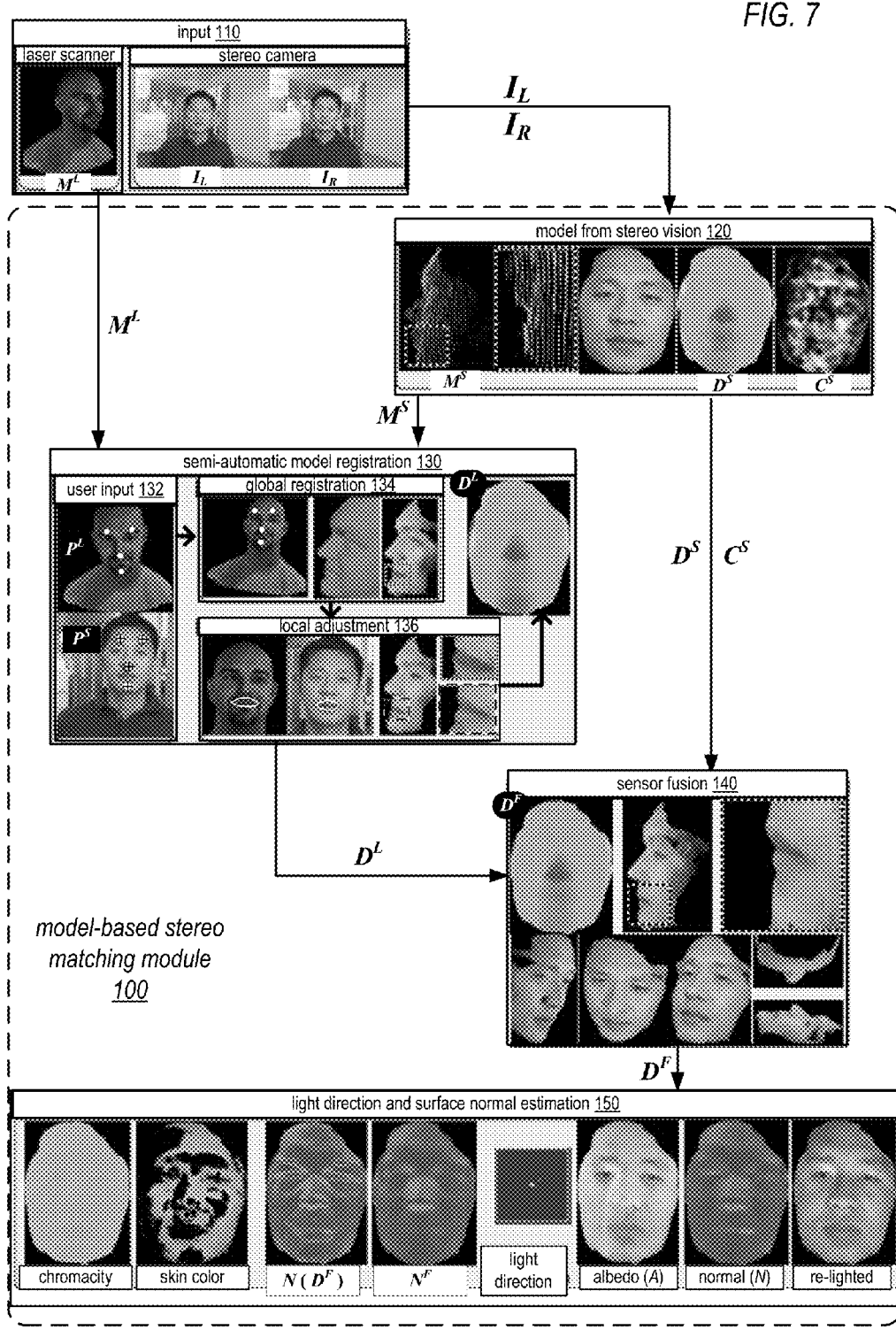
FIG. 7 is a block diagram illustrating the operation of a model-based stereo matching module.
Figure 10:
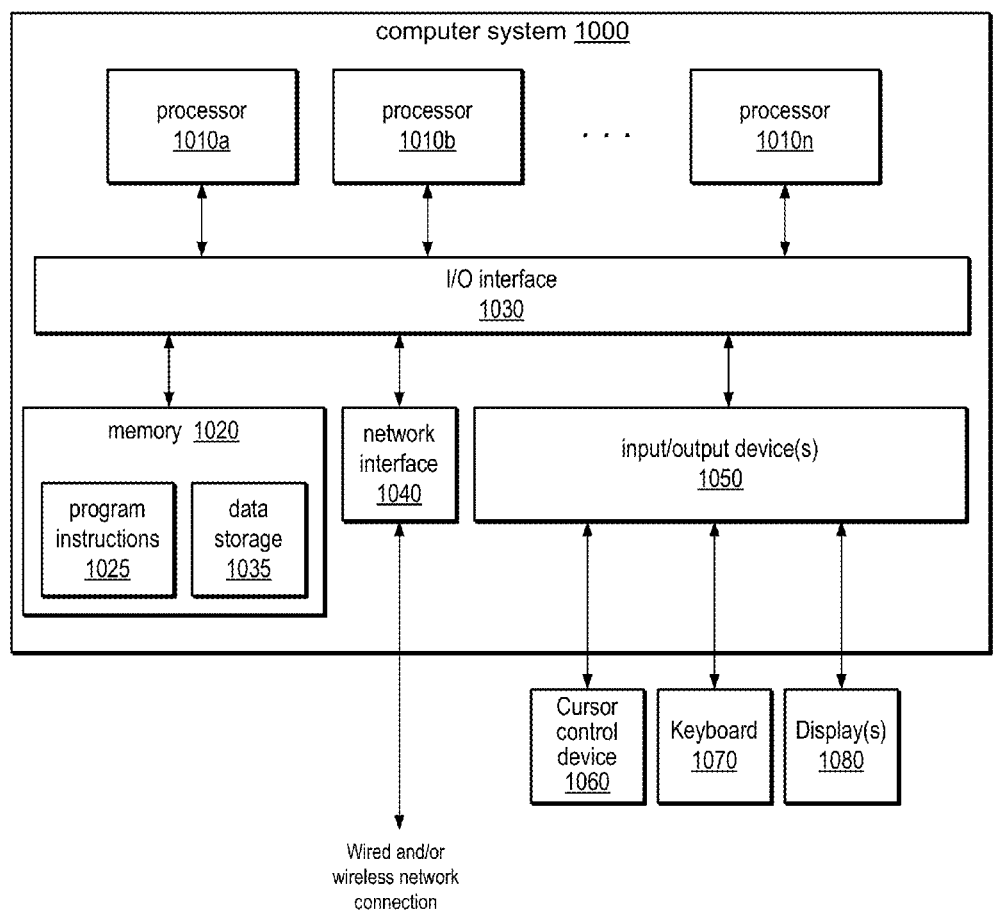
FIG. 10 illustrates an example computer system that may be used in embodiments.

Embodiments of an integrated modeling method, as described herein, may be implemented in a model-based stereo matching module implemented by program instructions stored in a computer-readable storage medium and executable by one or more processors (e.g., one or more CPUs and/or GPUs). In at least some embodiments, the model-based stereo matching module may implement an interactive modeling method in which at least a portion of the modeling process may be guided by user input, for example, to guide a model registration process. Embodiments of the model-based stereo matching module may, for example, be implemented as a stand-alone application, as a module of an application, as a plug-in for applications including image processing applications, and/or as a library function or functions that may be called by other applications such as image processing applications. Embodiments of the model-based stereo matching module may be implemented in any image processing application. An example model-based stereo matching module that may implement the integrated modeling method, as described herein, is illustrated in FIGS. 6 and 7. An example system in which a model-based stereo matching module may be implemented is illustrated in FIG. 10.

FIG. 6 illustrates an example module that may implement embodiments of the integrated modeling method(s), as described herein. Model-based stereo matching module 100 may, for example, implement a model from stereo vision method as submodule 120, a semi-automatic model registration method as submodule 130, a sensor fusion method as submodule 140, and a light direction and surface normal estimation method as submodule 150.

Figure 8:
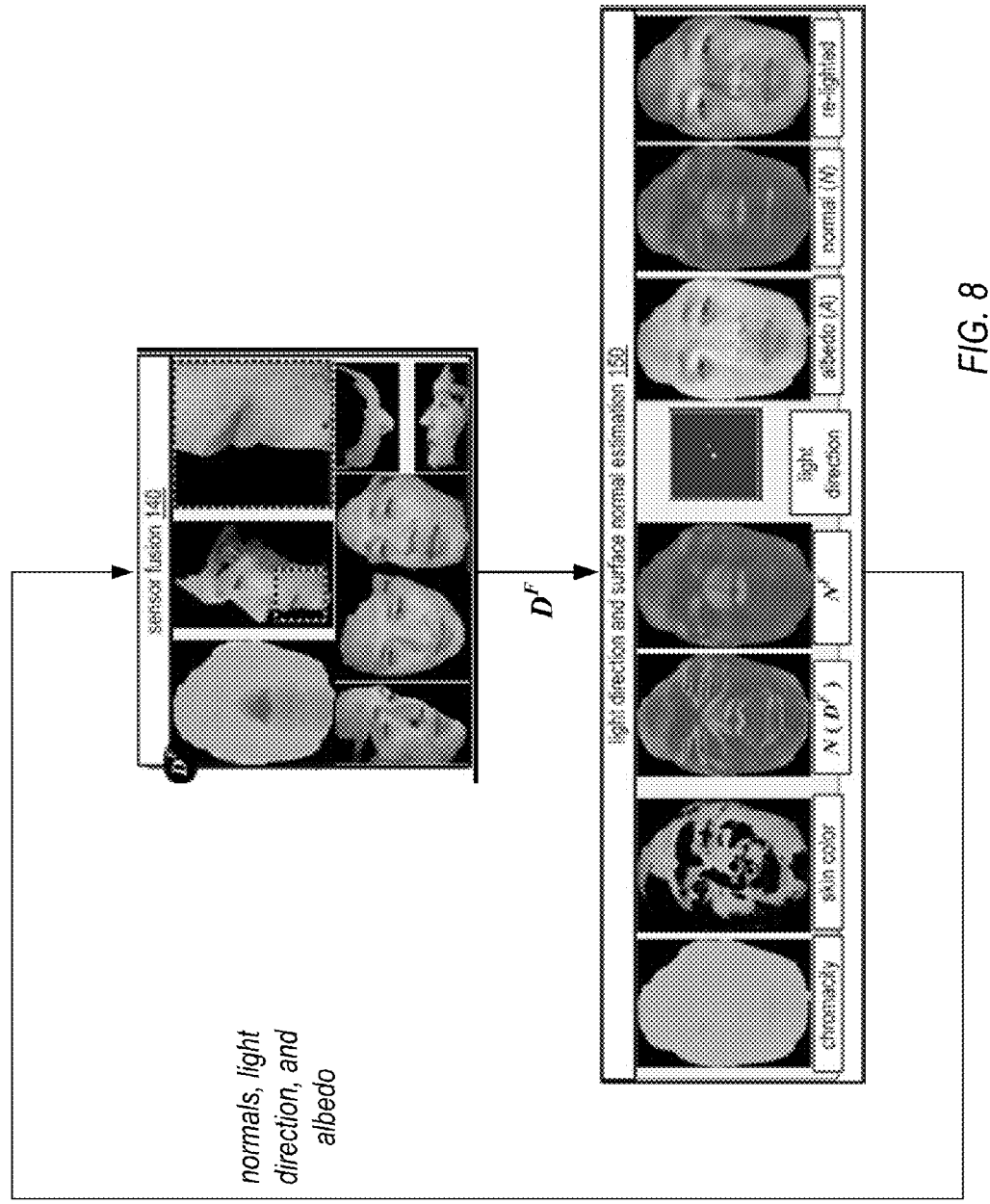
FIG. 8 illustrates iteratively performing sensor fusion and light direction and surface normal estimation to provide integrated estimation of depth, normal, light direction, and albedo, according to some embodiments.

Module 100 may receive, as input 110, a laser-scanned 3D model (or, alternatively, a model database) and a pair of images captured by a stereo camera. In one embodiment, the input model may be a non-laser-scanned 3D model. For example, the output of module 100 may be fed back as the input model to module 100 in one iterative embodiment. Module 100 may perform the integrated modeling method, for example as described below in relation to FIGS. 7 and 9. Some embodiments may iteratively perform sensor fusion 140 and light direction and surface normal estimation 150, as shown in FIG. 8, to provide integrated estimation of depth, surface normal, light direction, and albedo. Module 100 may receive user input 104. In one embodiment, a user may specify points as user input 104 for use in the registration/alignment process, described below, by submodule 130. In some embodiments, module 100 may provide a user interface 102 via which a user may interact with the module 100, for example, via user input 104 to specify points for registration, or to perform other interactive tasks. Output 170 may include, but is not limited to, a depth map, surface albedo, and a surface normal map. Output 170 may, for example, be stored to a storage medium 180, such as system memory, a disk drive, DVD, CD, etc. Output 170 may also be passed to one or more other modules 190 for further processing.

FIG. 7 is a block diagram illustrating the operation of a model-based stereo matching module 100 that implements an integrated modeling method according to at least some embodiments. The integrated modeling method may include several components that may be implemented in the model-based stereo matching module 100 as submodules:

- a model from stereo vision method implemented as submodule 120;
- a semi-automatic model registration method implemented as submodule 130;
- a sensor fusion method implemented as submodule 140; and
- a light direction and surface normal estimation method that computes normal and light direction from depth and shading, implemented as submodule 150.

In some embodiments, each of these components may be implemented as separate modules implemented by program instructions stored in a computer-readable storage medium and executable by one or more processors (e.g., one or more CPUs and/or GPUs), as shown in FIG. 10. The separate modules may be provided as modules of an application, as plug-ins for modules or applications including image processing modules or applications, and/or as library functions that may be called by other modules or applications such as image processing modules or applications.

Referring again to FIG. 7, inputs 110 to model-based stereo matching module 100 may include a laser-scanned 3D model ($M^L$) (see, for example, FIG. 3) and a stereo image pair ($I_L$ and $I_R$) (see, for example, FIG. 2). In one embodiment, the stereo image pair may be the resulting images from a stereo camera snapshot. In other embodiments, an n-way stereo that takes in n images could be provided to input 110. In some embodiments, a model database may replace the single laser-scanned 3D model as an input. See FIG. 4 for an example model database. In some embodiments, the input model is a non laser-scanned model. The output of model-based stereo matching module 100 may be a final face model including, but not limited to, a depth map ($D^F$), normal map (N) and surface albedo (A). See FIG. 5 for an example output depth map.

Referring again to FIG. 7, a stereo pair (a left and right image, designated $I_L$ and $I_R$, respectively) may be provided to or obtained by submodule 120. Submodule 120 may perform stereo matching to generate its outputs, which may include an estimated stereo depth map ($D^S$), confidence map ($C^S$) and a 3D stereo model ($M^S$), which may be established from the estimated stereo depth map.

In at least some embodiments, submodule 120 may utilize a loopy belief propagation (BP) based binocular stereo matching method. In one embodiment, the method may be used for face reconstruction, i.e., to generate $M^S$ and other outputs. In at least some embodiments, a global optimization method, rather than local optimization, may be employed. Global optimization may be more robust on low-textured surfaces such as faces. In at least some embodiments, an efficient BP algorithm, such as a constant space belief propagation (CSBP) algorithm, may be implemented to compute a disparity map. Use of a CSBP algorithm may result in a speed and memory cost improvement. A disparity, as used herein, means how many pixels away the matching pixels in two stereo images is calculated to be. For example, if a pixel at coordinates (3, 11) in stereo image $I_L$ is calculated to correspond to pixel (7, 11) in stereo image $I_R$, the disparity will be 4. Other methods or technologies to compute a disparity map may also be used.

In at least some embodiments of the integrated modeling method, a stereo confidence measure may be computed in submodule 120. Typically, a BP technique used for stereo matching may be used to find a corresponding pixel in the other stereo image by looking at the same row of pixels (height). In one embodiment, a fast-converging BP algorithm may be used. The algorithm may begin with each pixel in one image matching its colors to pixels in the other image to guess what its disparity may be. The algorithm may further integrate each pixel's calculation of its own disparity along with what neighboring pixels calculate (believe) as well. Further, the algorithm may be iterative such that, at each iteration, each pixel updates its individual belief and neighboring pixels update and propagate their beliefs. The phrases propagating a belief and updating messages are meant to be used interchangeably. At each iteration, the algorithm may identify each pixel as converging or not converging to a disparity. By detecting non-converged pixels and updating the messages of those pixels, the algorithm may decrease the running time in situations with a large number of iterations. After several iterations, the number of non-converged statuses (let it be T) may be accumulated for each pixel. Pixels with a greater number of non-converged statuses exhibit a lower confidence of the calculated disparity while pixels with a lesser number of non-converged statuses are more confident about the calculated disparity. For each given pixel, T values result in a number describing a confidence measure. Collectively, the confidence measure values make up the stereo confidence $C^S$. $C^S$ includes a value for each pixel from 0 to 1, with 0 representing less confidence and 1 representing more confidence. The stereo confidence, $C^S$, may be used in the fusion process described below or in any other algorithm or process that may benefit from knowing the confidence of stereo matching. Other processes that use stereo matching may benefit from the confidence measures.

In one embodiment, $M^S$ may need to be aligned with the laser-scanned model. Submodule 130 may register the stereo model $M^S$ generated by submodule 120 with the input laser-scanned model M'. In some embodiments, a user may be able to provide an input 132 to submodule 130. In other embodiments, submodule 130 may be fully automated, and not allow any user input. $M^L$ may include some predefined points. The predefined points may be predefined by a user or automatically predefined by an algorithm. In some embodiments, a user may be able to select one or more points on $M^S$ which correspond to the predefined points of the laser-scanned model $M^L$. For example, illustrated in FIG. 7, a user may select four points (crosses on the bottom image of user input 132) of $M^S$ that correspond to four predefined points (white circles on the top image of user input 132) of $M^L$. The four correspondences may then be used to compute a coarse transformation between $M^L$ and $M^S$, shown in global registration 134.

The transform in global registration 134 may include a constant scalar, a rotation matrix and a translation vector. In some embodiments, the transform may be computed using a method that performs a least-squares estimation of transformation parameters between two point patterns. The resulting coarse transformation may then be iteratively revised, which may, in some embodiments, utilize all points in the models and not just the predefined and selected points. In one embodiment, the revising is performed using an algorithm such as iterative closest point (ICP). The course estimation of the transform may be used as an initial estimation in the ICP technique, which may revise the transformation (rotation and translation) and minimize the distance between the two models.

In at least some embodiments, local manual adjustment 136 may also be used to improve the registration accuracy. Small variances around some features, for example around the mouth area, may be hard to capture in the stereo model. Thus, it may be difficult to register such a feature on the stereo model correctly with the laser-scanned model. As shown in FIG. 7, in the dotted box of the rightmost image of local adjustment 136, the mouth region of the registered model before local adjustment may not be well aligned. To locally adjust, the contour of the feature (e.g., mouth) on the laser-scanned model and several key points ($P^L$) on the contour may be manually selected in advance. For each input stereo model, the contour of the feature (e.g., mouth) on the stereo model may be selected by several line segments. The contour does not need to be very precise as the transform around the feature may be very smooth. The correspondence of the key points on the stereo model may also need to be identified, let them be designated as ($P^S$). The motion vectors of the key points may then be computed as the difference of the key points $P^L$–$P^S$, and the motion vector of the other points on the contour of the feature may then be interpolated from the motion vectors of these key points. In at least some embodiments, setting the motion vectors of points on a bounding box of the feature to all zero, a Poisson interpolation technique may be used to estimate the motion vectors for every point inside the feature area with the boundary conditions that the estimated motion vectors will be the same as those on the bounding box and the contour of the feature. While the mouth is used as an example feature, this local adjustment method may be applied to other regions or features. As example of local adjustment that may improve the registered model's results is shown in the dashed box of the rightmost image of local adjustment 136. Submodule 130 may output the registered laser-scanned model and a corresponding depth map computed from this model, referred to as $D^L$.

Submodule 140 may fuse the stereo model depth map $D^S$ with the registered, aligned laser-scanned model depth map $D^L$ and generate a new model that approximates both input models. The new fused model may include the shape of the stereo model and the smoothness and detail of the aligned/referenced model. As illustrated in FIG. 7, the upper left image of submodule 140 shows the fused depth map $D^F$, which may be smoother than the depth map from stereo vision $D^S$ and more detailed than the aligned model depth map $D^L$. Many differences exist between the details of the fused model and $D^L$. For instance, the eyes of $D^L$ are lower than the eyes of the fused model, and the curvature of the region between the chin and the mouth of $M^L$ is larger than the fused model. More views of the screenshots of the fused model are presented on the bottom row of images of submodule 140. Stereo confidence $C^S$ may also used in the fusion step to intelligently combine $D^S$ and $D^L$.

One objective of the sensor fusion method of submodule 140 may be to transfer the details (high-frequency component) from $D^L$ to $D^S$, while keeping the large-scale variations (low-frequency component) of $D^S$. In one embodiment, depth function $D^F$ may conform to the estimates for the gradient computed from $D^L$ and the depth obtained from $D^S$ at each point. To accomplish this, in at least some embodiments, a depth function may minimize the sum of two error terms: the gradient error $E^G$ and the depth error $E^D$.

The gradient error may be defined as the sum of squared distances between the partial derivatives of the optimized depth value $D^F$ and the depth values obtained from $D^L$:

$$E^G(D^F) = \sum_i \left( \frac{\partial D_i^F}{\partial x} - \frac{\partial D_i^L}{\partial x} \right)^2 + \left( \frac{\partial D_i^F}{\partial y} - \frac{\partial D_i^L}{\partial y} \right)^2. \quad (1)$$

The depth error $E^D$ may be defined as the sum of squared distances between the optimized depth value $D^F$ and that from stereo vision $D^S$:

$$E^D(D^F) = \sum_i (D_i^F - D_i^S)^2. \quad (2)$$

where $D_i^F$ is the depth value of the ith optimized point, and $D_i^L$ and $D_i^S$ are the depth values of the ith point obtained from the laser scanner and stereo vision, respectively.

A depth map $D^F$ may then be given by solving $$\operatorname*{argmin}_{D^F} \lambda E^D(D^F) + E^G(D^F), \quad (3)$$

where $\lambda=0.03$ is a constant scalar parameter. The constant scalar parameter $\lambda$ may also be other values. When the confidence measurement, $C^S$, of the employed stereo matching method is available, the depth map $D^F$ may be computed as follows:

$$\operatorname*{argmin}_{D^F} C^S(2\lambda E^D(D^F)) + (1 - C^S)E^G(D^F). \quad (4)$$

$C^S \in [0, 1]$ may control how much influence the depth error has in the optimization. Where the stereo confidence $C^S$ is 0, the method considers the result obtained from the laser-scanned 3D input exclusively, except in boundary conditions. Where $C^S$ is 1, the method returns the depth values from stereo matching exclusively. For intermediate values, the method performs a weighted combination of the two inputs. $C^S$ may be higher in high texture areas, such as eyebrows while $C^S$ may be lower in occluded areas, in areas with oblique angles, and in low-texture areas.

Each point/pixel may generate three equations. These equations may include one for the depth error and one for the gradient error in each of the x and y directions. Before squaring, the equations for the error terms are linear in the depth values being solved for. Therefore, the entire minimization can be formulated as a large over-constrained linear system to be solved, for example, by a least squares technique:

$$\begin{bmatrix} C^S(2\lambda)U \\ (1-C^S)\frac{\partial}{\partial x} \\ (1-C^S)\frac{\partial}{\partial y} \end{bmatrix} [D^F] = \begin{bmatrix} C^S(2\lambda)D^S \\ (1-C^S)\frac{\partial D^L}{\partial x} \\ (1-C^S)\frac{\partial D^L}{\partial y} \end{bmatrix}. \quad (5)$$

Here, U is an identity matrix and $$\frac{\partial}{\partial x}$$

represents a matrix that, when multiplied by the unknown vector $D^F$, produces a vector with one row per point. The matrix multiplication result is the gradient of $D^F$ in the x direction.

$$\frac{\partial}{\partial y}$$

represents the same operation as $$\frac{\partial}{\partial x}$$

but in the y direction.

$$\left[\frac{\partial}{\partial x}, \frac{\partial}{\partial y}\right]$$

is the gradient operator.
Let:

$$A = \begin{bmatrix} C^S(2\lambda)U \\ (1-C^S)\frac{\partial}{\partial x} \\ (1-C^S)\frac{\partial}{\partial y} \end{bmatrix} \quad (6)$$

and let:

$$b = \begin{bmatrix} C^S(2\lambda)D^S \\ (1-C^S)\frac{\partial D^L}{\partial x} \\ (1-C^S)\frac{\partial D^L}{\partial y} \end{bmatrix}, \quad (7)$$

Multiplying $A^T$ on both sides of equation (5), the following may be obtained:

$$[A^T A][D^F] = A^T b. \quad (8)$$

where:

$$A^T A = (C^S)^2 (2\lambda)^2 U + (1-C^S)^2 \Delta. \quad (9)$$

$$A^T b = (C^S)^2 (2\lambda)^2 D^S + (1-C^S)^2 \Delta D^L, \quad (10)$$

and:

$$\Delta = \frac{\partial^2}{\partial x^2} + \frac{\partial^2}{\partial y^2}$$

is the Laplacian operator.

In some embodiments, equation (8) can be solved using a conjugated gradient method. Although matrix $A^T A$ may be large, it may also be very sparse. Therefore, the number of non-zero entries may be linear in the number of pixels because there may be at most five non-zero entries per row (one coefficient for the depth of the reference pixel and the other for its neighbors used to find the second partial derivatives).

In some embodiments, the fused depth map $D^F$ may then be provided to submodule 150 for surface normal and light direction estimation. Generally, submodule 150 may roughly estimate the normal and robustly compute the light direction followed by refining the normal using the light direction to bring out details of the object. Normals may be vectors [x,y,z], such that x is red, y is green, and z is blue. For example, a body part pointing right back at the camera, like a chin, may be blue. The underside of the nose points down along the y axis and thus may be green.

In one embodiment, submodule 150 assumes that the albedo of the skin is a constant, and detects skin pixels based on surface chromaticities. A coarse normal map $N(D^F)$ may be computed from the fused depth map $D^F$. However, as shown in FIG. 7, such a normal map may include various incorrect details of the laser-scanned 3D model. As a result, at least some embodiments may smooth the fused depth map $D^F$, and then create a corresponding normal map $N^F$ from the smoothed depth map. The light direction and skin albedo may then be estimated using the intensity values of the detected skin pixels, and the corresponding normal vectors may be obtained from $N^F$. Finally, the estimated light direction, skin albedo and intensity values are used to refine the coarse normal estimate $N^F$ to obtain a refined normal map N. The light direction, normal map N, and the color values of the input image may then be used to compute the albedo at each pixel location, and can be used for scene re-lighting. A re-lighting example is shown in the rightmost image of submodule 150 in FIG. 7.

A more detailed example algorithm for estimating the surface normal and light direction is summarized below in algorithm (1). The method may first locate all the skin pixels based on surface chromaticities, and then compute a coarse normal map $N^F$ from the input depth map. Assuming that the albedo is constant over all skin pixels, the method may then compute the light direction L using the coarse normal map $N^F$ and the intensity of the skin pixels, for example using a simple Lambertian model. The coarse normal and the image intensity at each pixel location may then be used together with the estimated light direction to solve for the final normal at the current pixel location using the same Lambertian model.

Algorithm 1

1: Compute the chromaticity of the reference color image at each pixel and find the median chromaticity.
2: Keep only half of the image pixels as skin pixels based on the similarity of their chromaticity and the median chromaticity.
3: Smooth the depth map $D^F$ obtained from sensor fusion to remove the incorrect details. Let the smoothed depth map be designated as $D_S^F$.
4: Compute the coarse normal map $N^F$ from $D_S^F$.
5: Under the assumption of constant skin albedo, a simple Lambertian model, and directional light source, computes the light direction $$L = \frac{L}{\|L\|}$$

by solving an overconstrained linear system as follows:

$$\begin{bmatrix} \vdots \\ (N_i^F)^T \\ \vdots \end{bmatrix} [\mathcal{L}] = \begin{bmatrix} \vdots \\ I_i \\ \vdots \end{bmatrix}. \quad (11)$$

$N_i^F$ and $I_i$ are the normal and intensity at the ith skin pixel.

6: Compute the final normal map N at each pixel by solving the following linear system using the estimated light direction:

$$\begin{bmatrix} \mathcal{L}^T \\ U \end{bmatrix} [N_i] = \begin{bmatrix} I_i \\ N_i^F \end{bmatrix}. \quad (12)$$

U is a 3×3 identity matrix, $N_i^F$ and $I_i$ are the normal and intensity at the ith pixel.

In at least some embodiments, the input depth map $D^F$ may be refined using the shading information of the stereo image. The refined depth map may be more consistent with the other outputs that have been computed, e.g., the normals. One algorithm to refine a depth map is detailed below. Another algorithm is provided in the provisional application this application claims priority to.

Let the refined depth function be Z and the intrinsic matrix of the stereo camera be K, let $Z_0$ be the depth at pixel location [x, y], let $Z_x$ be the depth at [x+1, y], let $Z_y$ be the depth at [x, y+1], and let a=x+y+1. The normal at [x, y] will be:

$$\vec{n} = \frac{(K^{-1}\vec{dx}) \times (K^{-1}\vec{dy})}{\|(K^{-1}\vec{dx}) \times (K^{-1}\vec{dy})\|} \quad (13)$$

$$= \det(K^{-1})K^T \frac{\vec{dx} \times \vec{dy}}{\|\vec{dx} \times \vec{dy}\|},$$

where:

$$\vec{dx} = Z_0 \begin{bmatrix} x \\ y \\ 1 \end{bmatrix} - Z_x \begin{bmatrix} x+1 \\ y \\ 1 \end{bmatrix}, \quad (14)$$

$$\vec{dy} = Z_0 \begin{bmatrix} x \\ y \\ 1 \end{bmatrix} - Z_y \begin{bmatrix} x \\ y+1 \\ 1 \end{bmatrix}, \quad (15)$$

$$\vec{dx} \times \vec{dy} = \begin{bmatrix} Z_y(Z_0 - Z_x) \\ Z_x(Z_0 - Z_y) \\ aZ_xZ_y - (xZ_y + yZ_x)Z_0 \end{bmatrix}. \quad (16)$$

Using the estimated light direction and the skin albedo, the following is obtained:

$$f(Z_0, Z_x, Z_y) = \mathcal{L}^T \cdot \vec{n} - I_{x,y} = 0. \quad (17)$$

Let:

$$H = \det^2(K^{-1})(K^{-T}\mathcal{L}\mathcal{L}^T K^T).$$

and:

$$E = \det^2(K^{-1})(K^{-T}K^T),$$

then H and E are both constant 3×3 matrices. Let:

$$F = H - I_{x,y}^2 E$$

and:

$$G = (\vec{dx} \times \vec{dy})(\vec{dx} \times \vec{dy})^T,$$

Substituting equation (13) into equation (17), the following is obtained:

$$f(Z_0, Z_x, Z_y) = F:F = 0, \quad (18)$$

where the symbol ":" represents the Frobenius inner product operation.

Newton's iteration method may then be used to solve equation (18):

$$f(Z_0^{t+1}, Z_x^{t+1}, Z_y^{t+1}) = \quad (19)$$

$$f(Z_0^t, Z_x^t, Z_y^t) + \quad (20)$$

$$\frac{\partial f(Z_0^t, Z_x^t, Z_y^t)}{\partial Z_0}(Z_0^{t+1} - Z_0^t) + \quad (21)$$

$$\frac{\partial f(Z_0^t, Z_x^t, Z_y^t)}{\partial Z_x}(Z_x^{t+1} - Z_x^t) + \quad (22)$$

$$\frac{\partial f(Z_0^t, Z_x^t, Z_y^t)}{\partial Z_y}(Z_y^{t+1} - Z_y^t) = 0. \quad (23)$$

At each iteration, a linear system is solved:

$$[0, \cdots, df_0, df_x, 0, \cdots, df_y, 0, \cdots] \begin{bmatrix} \vdots \\ Z_0^{t+1} \\ \vdots \end{bmatrix} \quad (24)$$

$$= df_0 Z_0^t + df_x Z_x^t + df_y Z_y^t \quad (25)$$

$$-f(Z_0^t, Z_x^t, Z_y^t), \quad (26)$$

where:

$$df_0 = \frac{\partial f(Z_0^t, Z_x^t, Z_y^t)}{\partial Z_0}, \quad (27)$$

which can be computed from equation (18).

Let $$J = [J_0, J_x, J_y] = \quad (28)$$

$$= \begin{bmatrix} Z_y & -Z_y & Z_0 - Z_x \\ Z_x & Z_0 - Z_y & -Z_x \\ -xZ_y - yZ_x & \alpha Z_y - yZ_0 & \alpha Z_x - xZ_0 \end{bmatrix} \quad (29)$$

be the Jacobian matrix of vector $\vec{d}x \times \vec{d}y$ with respect to $[Z_0, Z_x, Z_y]$. Then:

$$df_0 = F : \left( \left[ J_0, \vec{dx} \times \vec{dy} \right] \begin{bmatrix} \left( \vec{dx} \times \vec{dy} \right)^T \\ J_0^T \end{bmatrix} \right) \quad (30)$$

$$df_x = F : \left( \left[ J_x, \vec{dx} \times \vec{dy} \right] \begin{bmatrix} \left( \vec{dx} \times \vec{dy} \right)^T \\ J_x^T \end{bmatrix} \right) \quad (31)$$

$$df_y = F : \left( \left[ J_y, \vec{dx} \times \vec{dy} \right] \begin{bmatrix} \left( \vec{dx} \times \vec{dy} \right)^T \\ J_{0y}^T \end{bmatrix} \right). \quad (32)$$

The definition of $\vec{d}x \times \vec{d}y$ is provided in equation (16).

Instead of solving the large linear system in equation (26), which may be slow, a more efficient solution that may be used in some embodiments may be obtained by setting $$Z_x^{t+1} = Z_x^t$$

and $$Z_y^{t+1} = Z_y^t$$

in equation (23). Equation (23) may then be simplified as $$Z_0^{t+1} = Z_0^t - \frac{f(Z_0^t, Z_x^t, Z_y^t)}{\frac{\partial f(Z_0^t, Z_x^t, Z_y^t)}{\partial Z_0}} = Z_0^t - \frac{f(Z_0^t, Z_x^t, Z_y^t)}{df_0}. \quad (33)$$

Turning now to FIG. 8, some embodiments may iteratively perform sensor fusion 140 and light direction and surface normal estimation 150 to provide integrated estimation of depth, surface normal, light direction, and albedo. In these embodiments, as shown in FIG. 8, the outputs from light direction and surface normal estimation 150 may be fed back to sensor fusion 140 to iteratively improve overall results. In other embodiments, outputs from light direction and surface normal estimation 150 may be fed back to another component of model-based stereo matching module 100. For example, the output model may replace the input laser-scanned model or be added to the library of models.

In one embodiment, the depth map may be improved by using the normals from submodule 150 as an additional input to the fusion module 140 and by modifying the basic fusion algorithm to include the additional input. The basic fusion algorithm is given by the following 3 equations:

$$[D^F] = D^S$$

$$\left[ \frac{\partial}{\partial x} D^F \right] = \frac{\partial D^L}{\partial x}$$

$$\left[ \frac{\partial}{\partial y} D^F \right] = \frac{\partial D^L}{\partial y}$$

In one embodiment, the second and third equations could be replaced with a term that encourages the normals implied by the fused result to agree with the input normals. The normals implied by the fused depth map, $N(D^F)$, may be specified with equations (13)-(16) above (with $D^F$ instead of Z). The fusion algorithm may then include:

$$(*) N(D^F) = N,$$

where N is the normal output from sensor fusion 140 and the equation is computed at each pixel (x,y). (*) could replace the second and third equations using the laser-scanned model or be added to the algorithm.

Integrated Modeling Method Flowchart

Figure 9:
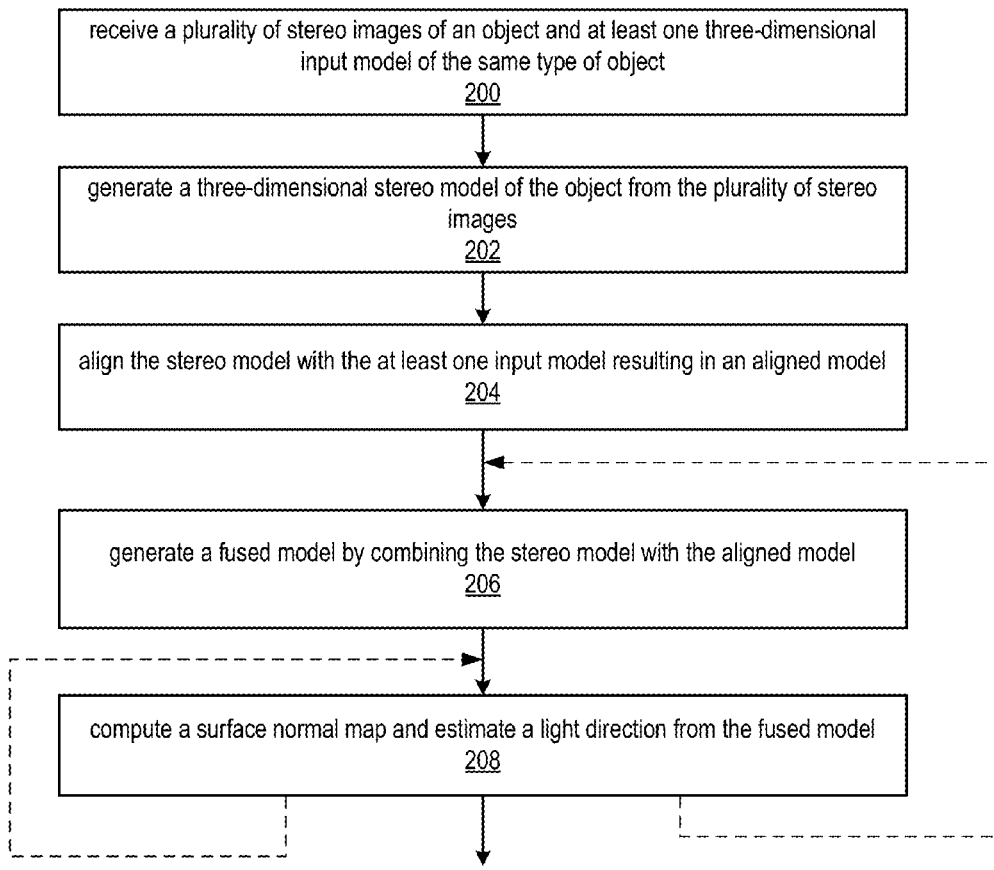
FIG. 9 is a flowchart of an integrated modeling method, according to at least some embodiments.

FIG. 9 is a flowchart of an integrated modeling method, according to at least some embodiments. As indicated at 200, a plurality of stereo images of an object (e.g., a human face) and at least one three-dimensional input model of the same type of object may be received. In some embodiments, a single, laser-scanned model may be obtained. In other embodiments, a model database including a plurality of models may be obtained. In some embodiments, the input 3D model may be the output of a previous iteration of the integrated modeling method. In some embodiments, the input 3D model is a non-laser-scanned model. The object may be any type of object including, but not limited to, human faces, animals, plants, or landscapes.

As indicated at 202, a three-dimensional model of the object may be generated from the plurality of stereo images of the object. In some embodiments, generating a three-dimensional model of the object may be performed by applying belief propagation (BP) based binocular stereo matching technology. In some embodiments, generating a three-dimensional model of the object may include applying constant space belief propagation (CSBP) technology to compute a disparity map. Further, in some embodiments, generating a 3D model of the object may include computing a stereo confidence $C^S$ and/or a stereo depth map $D^S$.

As indicated at 204, the stereo model $M^S$ may be aligned, or registered, with the at least one input model $M^L$ resulting in an aligned model. In one embodiment, texture data of the input model may not be used in the alignment process. Aligning the two models may include receiving a user input, such as selecting points on $M^S$ that correspond to predetermined points on $M^L$. In one embodiment, a course transformation, or global registration, may be computed based on the correspondences. Global registration may also include iteratively revising the transformation. In one embodiment, the iterative revision may be performed using an iterative closest point algorithm. The results of global registration may be locally adjusted to refine the output aligned/registered model.

As indicated at 206, a fused model may be generated by combining the depth map of the object $D^S$ with the aligned-model depth map $D^L$. The fused model may approximate both input models including the shape of the stereo model and the detail and smoothness of the aligned model. In at least some embodiments, the fusion process may compute a fused depth map that may minimize the sum of a gradient error and a depth error, as discussed above. The stereo confidence $C^S$ may be used to intelligently combine $D^S$ and $D^L$. In one embodiment, $C^S$ may be a value from 0 to 1, inclusive, for each pixel. If the confidence of a pixel in the stereo model is 0, then the corresponding pixel in the fused model may be generated entirely from the corresponding pixel in the aligned model. If the confidence of a pixel in the stereo model is 1, then the corresponding pixel in the fused model may be generated entirely from the stereo model.

As indicated at 208, a surface normal map and a light direction may be estimated from the fused model. In one embodiment, a rough surface normal may be estimated followed by computing the light direction. Next, the normal may be refined using the computed light direction, which may result in bringing out details of the object. In one embodiment, a skin albedo may also be calculated. In some embodiments, shown in FIG. 9 with the feedback line to the input to step 208, the surface normal map may be refined according to the light direction, albedo, and intensity values to generate a refined surface normal map.

In some embodiments, some of or all of elements 200-208 may be iteratively performed. One embodiment is illustrated with the feedback line from step 208 to the input of step 206. In that scenario, the generated surface normal map and estimated light direction and albedo may be fed back to the fusion step to iteratively improve results of the fused depth map $D^F$.

In one embodiment, elements 200-208 may be performed using only one input 3D model. In other embodiments, elements 200-208 may be performed using more than one input 3D model.

While embodiments are generally illustrated and described as being applied for modeling human faces, at least some embodiments of the integrated modeling method may be applied to other objects or models, such as airplanes, people (full bodies), buildings or other structures, automobiles or other vehicles, etc.

Some embodiments may provide interactive tools for editing disparity maps given stereo pairs. In some embodiments, user interface elements may be provided that allow a user to pick a model from a set of models displayed on the user interface and, for example, drop the model on an object in one of the views for disparity refinement. In some embodiments, for objects in a scene that are unavailable as models, a user interface may provide one or more user interface elements or tools (e.g., brushes) via which the user may adjust previously computed disparity maps.

Example System

Embodiments of a model-based stereo matching module and/or of the various submodules as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a model-based stereo matching module and/or of the various submodules as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a model-based stereo matching module and/or of the various submodules as described herein, and data storage 1035, comprising various data accessible by program instructions 1025. In one embodiment, program instructions 1025 may include software elements of embodiments of a model-based stereo matching module and/or of the various submodules as illustrated in the provided Figures and as described herein. Data storage 1035 may include data that may be used in embodiments. In other embodiments, other or different software elements and data may be included.

Those skilled in the art will appreciate that computer system 1000 is merely illustrative and is not intended to limit the scope of a model-based stereo matching module and/or of the various submodules as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Example Results

Figure 11:
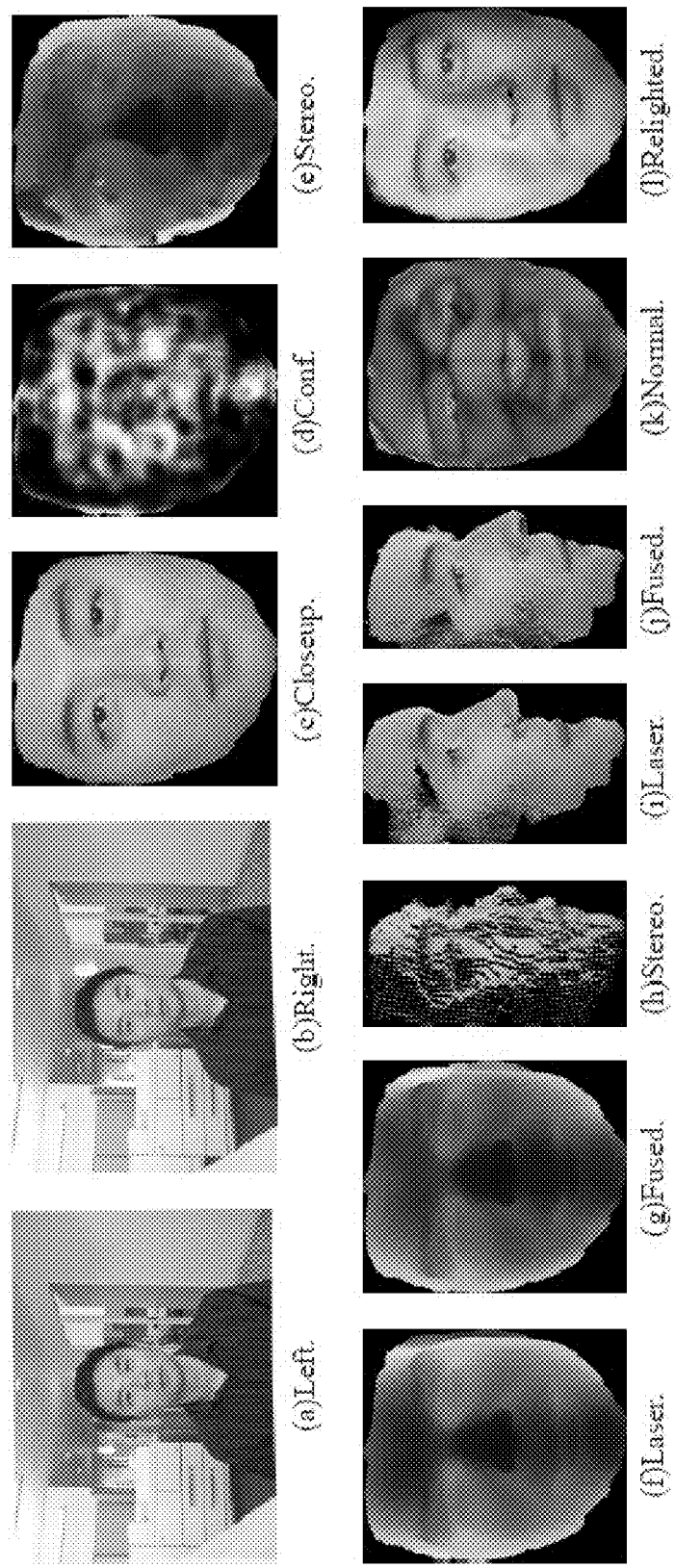
FIG. 11 illustrates modeling results for an example face, according to some embodiments.

FIG. 11 illustrates modeling results for an example face, according to some embodiments. FIG. 11 (*a*) and FIG. 11 (*b*) are the input stereo images. FIG. 11 (*c*) is the close-up of the face in FIG. 11 (*a*). FIG. 11 (*d*) and FIG. 11 (*e*) are the confidence map and depth map computed from stereo matching, respectively. FIG. 11 (*f*) is the registered laser-scanned model and 11 (*g*) is the fused model. FIG. 11 (*h*)-(*j*) are the screenshots of the stereo model, laser-scanned model and fused model, respectively. FIG. 11 (*k*) is the estimated surface normal map, and FIG. 11 (*l*) is the re-lighted result of FIG. 11 (*c*) using the estimated normal map in FIG. 11 (*k*).

FIG. 11 illustrates modeling results of a person whose face is quite different from the laser-scanned model used, as can be seen from the stereo model in FIG. 11 (*h*) and registered laser-scanned model in FIG. 11 (*i*). The fused model is presented in FIG. 11 (*j*). The incorrect mouth and chin are corrected in FIG. 11 (*j*). FIG. 11 (*k*) is the estimated surface normal, which is then used for scene relighting as shown in FIG. 11 (*l*).

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
performing, by one or more computers:
receiving a plurality of stereo images of an object of a type and at least one three-dimensional input model of the same type of object;
generating a three-dimensional stereo model of the object from the plurality of stereo images;
computing a confidence measure for the stereo model;
aligning the stereo model with the at least one input model resulting in an aligned model; and
generating a fused model by combining the stereo model with the aligned model using the confidence measure to compute a weighted combination of the stereo model and the aligned model.

2. The method of claim 1, wherein said computing the confidence measure includes computing a respective confidence measure value for each pixel of the stereo model, wherein said combining includes weighting each pixel of the stereo model and each pixel of the aligned model based, at least in part, on the respective confidence measure values.

3. The method of claim 1, wherein said combining comprises minimizing a sum of a gradient error and a depth error, wherein the gradient error is computed by matching a plurality of gradients of the aligned model with a plurality of gradients of the fused model and the depth error is computed by matching a plurality of depths resulting from the stereo model generation with a plurality of depths resulting from the fused model generation, and wherein the depth error is weighted by the confidence measure.

4. The method of claim 1, wherein the computing the confidence measure includes using an iterative algorithm.

5. The method of claim 4, wherein the computing the confidence measure includes detecting a convergence status of each of a plurality of pixels of the stereo model and accumulating the convergence statuses of the pixels over a plurality of iterations of the algorithm.

6. The method of claim 1, wherein the aligning the stereo model with the at least one input model comprises:
receiving a plurality of inputs to the stereo model corresponding to a plurality of selected points in the at least one input model; and
computing a transformation between the stereo model and the at least one input model, based on the corresponding inputs.

7. The method of claim 6, wherein the aligning the stereo model with the at least one input model further comprises revising the transformation iteratively to minimize the difference between the stereo model and the at least one input model and locally adjusting an area of the transformation.

8. The method of claim 1, further comprising computing a surface normal based on the fused model.

9. The method of claim 8, wherein the computing the surface normal comprises:
generating a rough normal map from the fused model; and
for each pixel of the of the fused model:
computing an intensity of the pixel;
estimating a light direction based on the rough normal map and the intensity; and
refining a final normal using the estimated light direction.

10. The method of claim 8, further comprising iteratively performing:
the generating the fused model by providing the surface normal as an input to the generating resulting in an iterative fused model; and
the computing the surface normal based on the iterative fused model.

11. The method of claim 8, further comprising refining the fused model based on a shading information of the stereo images and a light direction of the fused model.

12. A system, comprising:
at least one processor; and
a memory comprising program instructions, wherein the program instructions are executable by the at least one processor to:
receive a stereo pair of images of an object of a type and at least one three-dimensional input model of the same type of object;
generate a three-dimensional stereo model of the object from the stereo pair of images of the object;
compute a confidence measure for the stereo model;
align the stereo model with the at least one input model resulting in an aligned model; and
generate a fused model by combining the stereo model with the aligned model using the confidence measure to compute a weighted combination of the stereo model and the aligned model.

13. The system of claim 12, wherein, to compute the confidence measure, the program instructions are executable by the at least one processor to compute a respective confidence measure value for each pixel of the stereo model, wherein said combining includes weighting each pixel of the stereo model and each pixel of the aligned model based, at least in part, on the respective confidence measure values.

14. The system of claim 12, wherein, to generate the fused model, the program instructions are executable by the at least one processor to:
minimize a sum of a gradient error and a depth error, wherein the gradient error is computed by matching a plurality of gradients of the aligned model with a plurality of gradients of the fused model and the depth error is computed by matching a plurality of depths from the stereo model generation with a plurality of depths from the fused model generation.

15. The system of claim 12, wherein, to determine the confidence measure, the program instructions are executable by the at least one processor to apply an algorithm iteratively.

16. The system of claim 15, wherein, to determine the confidence measure, the program instructions are executable by the at least one processor to:
detect a convergence status of each of a plurality of pixels of the stereo model; and
accumulate the convergence statuses of the pixels over a plurality of iterations of the algorithm.

17. The system of claim 12, wherein, to align the stereo model with the at least one input model, the program instructions are executable by the at least one processor to:
   receive a plurality of inputs to the stereo model corresponding to a plurality of selected points in the at least one input model;
   compute a transformation between the stereo model and the at least one input model, based on the corresponding inputs; and
   revise the transformation iteratively to minimize the difference between the stereo model and the at least one input model.

18. The system of claim 12, further comprising wherein the program instructions are executable by the at least one processor to compute a surface normal based on the fused model.

19. The system of claim 18, wherein, to compute the surface normal, the program instructions are executable by the at least one processor to:
   generate a rough normal map from the fused model; and
   for each pixel of the of the fused model:
      compute an intensity of the pixel;
      estimate a light direction based on the rough normal map and the intensity; and
      refine a final normal using the estimated light direction.

20. The system of claim 18, further comprising wherein the program instructions are executable by the at least one processor to iteratively:
   generate the fused model by looping the surface normal back as an input to the generation; and
   compute the surface normal based on the iterative fused model.

21. The system of claim 18, further comprising wherein the program instructions are executable by the at least one processor to refine the fused model based on a shading information of the stereo images and a light direction of the fused model.

22. A computer-readable storage medium, excluding signals, a carrier wave, and a communication network, the computer-readable storage medium comprising program instructions stored thereon that, responsive to execution by a computer, causes the computer to perform operations comprising:
   receiving a plurality of stereo images of an object of a type and at least one three-dimensional input model of the same type of object;
   generating a three-dimensional stereo model of the object from the plurality of stereo images;
   computing a confidence measure for the stereo model;
   aligning the stereo model with the at least one input model resulting in an aligned model; and
   generating a fused model by combining the stereo model with the aligned model using the confidence measure to compute a weighted combination of the stereo model and the aligned model.

23. The computer-readable storage medium of claim 22, wherein said computing the confidence measure includes computing a respective confidence measure value for each pixel of the stereo model, wherein said combining includes weighting each pixel of the stereo model and each pixel of the aligned model based, at least in part, on the respective confidence measure values.

24. The computer-readable storage medium of claim 22, wherein said combining comprises minimizing a sum of a gradient error and a depth error, wherein the gradient error is computed by matching a plurality of gradients of the aligned model with a plurality of gradients of the fused model and the depth error is computed by matching a plurality of depths from the stereo model generation with a plurality of depths from the fused model generation, and wherein the depth error is weighted by the confidence measure.

25. The computer-readable storage medium of claim 22, wherein the computing the confidence measure includes using an iterative algorithm.

26. The computer-readable storage medium of claim 25, wherein the computing the confidence measure includes detecting a convergence status of each of a plurality of pixels of the stereo model and accumulating the convergence statuses of the pixels over a plurality of iterations of the algorithm.

27. The computer-readable storage medium of claim 22, wherein the aligning the stereo model with the at least one input model comprises:
   receiving a plurality of inputs to the stereo model corresponding to a plurality of selected points in the at least one input model;
   computing a transformation between the stereo model and the at least one input model, based on the corresponding inputs; and
   revising the transformation iteratively to minimize the difference between the stereo model and the at least one input model.

28. The computer-readable storage medium of claim 22, further comprising wherein the program instructions are computer-executable to implement computing a surface normal based on the fused model.

29. The computer-readable storage medium of claim 28, wherein, to compute the surface normal, the program instructions are computer-executable to implement:
   generating a rough normal map from the fused model; and
   for each pixel of the of the fused model:
      computing an intensity of the pixel;
      estimating a light direction based on the rough normal map and the intensity; and
      refining a final normal using the estimated light direction.

30. The computer-readable storage medium of claim 28, further comprising wherein the program instructions are computer-executable to iteratively implement:
   generating the fused model by looping the surface normal back as an input to the generation; and
   computing the surface normal based on the iterative fused model.

31. The computer-readable storage medium of claim 28, further comprising wherein the program instructions are computer-executable to implement refining the fused model based on a shading information of the stereo images and a light direction of the fused model.

* * * * *

UNITED STATES PATENT AND TRADEMARK OFFICE
CERTIFICATE OF CORRECTION

| | | |
|---|---|---|
| PATENT NO. | : 8,447,098 B1 | |
| APPLICATION NO. | : 12/952431 | |
| DATED | : May 21, 2013 | |
| INVENTOR(S) | : Scott D. Cohen | |

It is certified that error appears in the above-identified patent and that said Letters Patent is hereby corrected as shown below:

In the Claims

Column 20, Line 6, Claim 9, between "...each pixel" and "fused model:", delete "of the of the" and insert -- of the --, therefor.

Column 21, Line 21, Claim 19, between "...each pixel" and "fused model:", delete "of the of the" and insert -- of the --, therefor.

Column 22, Line 41, Claim 29, between "...each pixel" and "fused model:", delete "of the of the" and insert -- of the --, therefor.

Signed and Sealed this
Twenty-second Day of October, 2013

Teresa Stanek Rea
*Deputy Director of the United States Patent and Trademark Office*